United States Patent
Chen

(10) Patent No.: US 7,729,220 B2
(45) Date of Patent: Jun. 1, 2010

(54) SYSTEM AND METHOD FOR ADJUSTING TILT ANGLE OF LIGHT BEAM

(75) Inventor: Ying-Che Chen, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 665 days.

(21) Appl. No.: 11/617,093

(22) Filed: Dec. 28, 2006

(65) Prior Publication Data

US 2008/0159093 A1    Jul. 3, 2008

(51) Int. Cl.
    *G11B 7/08* (2006.01)
(52) U.S. Cl. .................. 369/53.19; 369/44.32
(58) Field of Classification Search .................. None
    See application file for complete search history.

(56) References Cited

U.S. PATENT DOCUMENTS

| 6,625,091 | B2 | 9/2003 | Obara |
| 7,038,977 | B2 | 5/2006 | Cheong et al. |
| 2006/0114774 | A1* | 6/2006 | Kun-yi .................. 369/44.32 |
| 2006/0209655 | A1 | 9/2006 | Hibino |
| 2007/0104063 | A1* | 5/2007 | Bang .................. 369/53.19 |

FOREIGN PATENT DOCUMENTS

CN    1477626 A    2/2004

OTHER PUBLICATIONS

Machine translation of JP 2004-079069 A into English, Yoshimoto.*

* cited by examiner

*Primary Examiner*—Wayne R Young
*Assistant Examiner*—Brian Butcher
(74) *Attorney, Agent, or Firm*—Jeffrey T. Knapp

(57) ABSTRACT

A method for adjusting a tilt angle of a light beam emitted by an optical pickup unit of an optical disc drive, the method includes steps of adjusting the tilt angle of the light beam according to test parameters preinstalled in the optical disc drive; detecting focusing error signals, the focusing error signals being generated based on the light beam reflected from an optical disc; generating current parameters based on the focusing error signals; storing the current parameters; adjusting the tilt angle of the light beam according to the current parameters.

18 Claims, 5 Drawing Sheets

< Related Art >

SYSTEM AND METHOD FOR ADJUSTING TILT ANGLE OF LIGHT BEAM

BACKGROUND OF THE INVENTION

1. Field of the Invention

This invention relates to optical disc drives, and more particularly to a system and a method for adjusting a tilt angle of a light beam related to an optical disc.

2. Description of Related Art

Nowadays, optical discs are widely used for storing information. Related optical disc drives for reproducing/recording data from/onto the optical discs are also widely used.

Referring to FIG. 5, a traditional optical disc drive 500 capable of reproducing/recording an optical disc 600 is illustrated. The optical disc drive 500 includes a spindle motor 502, an optical pickup unit 504, a sled shaft 506, a sled motor 508, and a controller 510. The optical disc 600 is arranged on and rotated at a predetermined velocity by the spindle motor 502. The optical pickup unit 504 is disposed to face a read-out surface of the optical disc 600. The optical pickup unit 504 is movable along a radial direction of the optical disc 600 by the sled motor 508 and the sled shaft 506.

Generally, a light beam emitted by the optical pickup unit 504 is required to be correctly focused onto tracks of the optical disc 600. The tracks are arranged in concentric or spiral manner from an inner side to an outer side of the optical disc 600. During a reproducing or recording process, the optical pickup unit 504 is moved from the inner side to the outer side by the sled motor 508 and the sled shaft 506. However, mechanical parts usually lead to assembling errors, such as the sled shaft 506 assembled in the optical disc drive 500 is usually not absolutely parallel to the optical disc 600. This will cause an oblique angle between a moving path of the optical pickup unit 504 and the optical disc 600. Therefore, a tilt angle of the light beam is required to be adjusted to compensate the oblique angle. A plurality of test parameters are assigned to adjust the tilt angle of the light beam. Generally, the test parameters are derived by testing the disk drive with an ideal glass plate. The test parameters are stored in storage units of the optical disc drive 500, for example, a read only memory (ROM). When the optical disc 600 is loaded in the optical disc drive 500, the test parameters are used to adjust the tilt angle of the light beam so as to correctly focus the light beam onto the tracks.

However, there are many types of optical discs in the market, while a plenty of which are not standard as the ideal glass plate, such as planeness of the optical discs. Especially, recording layers of the optical discs may be warped due to poor quality or improper storage of the optical discs. In this situation, if the light beam is maintained at a same tilt angle during a recording or a reproducing process, the optical discs may be recorded or reproduced incorrectly.

Therefore, an optical disc drive with adjustable tilt angle of the light beam according to the optical discs is desired.

SUMMARY OF THE INVENTION

A system for adjusting a tilt angle of a light beam emitted by an optical pickup unit includes a storage unit, an input unit, a signal-processing unit, a memory, and an output unit. The storage unit is used for storing test parameters, the test parameters being used for adjusting the tilt angle of the light beam to compensate a first angle between a moving path of the optical pickup unit and an ideal glass plate. The input unit is used for receiving focusing error signals, the focusing error signals being generated based on the light beam that is adjusted according to the test parameters and reflected from an optical disc. The signal-processing unit is used for processing the focusing error signals and generating current parameters based on the focusing error signals. The memory is used for storing the current parameters. The output unit is used for outputting the current parameters. The current parameters are used for adjusting the tilt angle of the light beam to compensate a second angle between the moving path of optical pickup unit and the optical disc.

A method for adjusting a tilt angle of a light beam emitted by an optical pickup unit of an optical disc drive, the method includes steps of adjusting the tilt angle of the light beam according to test parameters preinstalled in the optical disc drive; detecting focusing error signals, the focusing error signals being generated based on the light beam reflected from an optical disc; generating current parameters based on the focusing error signals; storing the current parameters; adjusting the tilt angle of the light beam according to the current parameters.

An optical disc drive includes an optical pickup unit for emitting a light beam, a sled motor for moving the optical pickup unit, a controller for controlling the sled motor, a storage unit, an input unit, a signal-processing unit, a memory, and an output unit. The storage unit is used for storing test parameters, the test parameters being used for adjusting the tilt angle of the light beam to compensate a first angle between a moving path of the optical pickup unit and an ideal glass plate. The input unit is used for receiving focusing error signals, the focusing error signals being generated based on the light beam that is adjusted according to the test parameters and reflected from an optical disc. The signal-processing unit is used for processing the focusing error signals and generating current parameters based on the focusing error signals. The memory is used for storing the current parameters. The optical pickup unit includes an actuator and an objective lens. The output unit is used for outputting the current parameters to the actuator. The actuator is used for adjusting positions of the objective lens for adjusting the tilt angle of the light beam to compensate a second angle between the moving path of optical pickup unit and the optical disc.

Other advantages and novel features will become more apparent from the following detailed description of preferred embodiments when taken in conjunction with the accompanying drawings, in which:

BRIEF DESCRIPTION OF THE DRAWINGS

Many aspects of the optical disc drive can be better understood with reference to the following drawings. The components in the drawings are not necessarily to scale, the emphasis instead being placed upon clearly illustrating the principles of the present device. Moreover, in the drawings, like reference numerals designate corresponding parts throughout the several views.

DETAILED DESCRIPTION OF THE INVENTION

Reference will now be made to the drawings to describe the preferred embodiment of the present optical disc drive, in detail.

Figure 1:
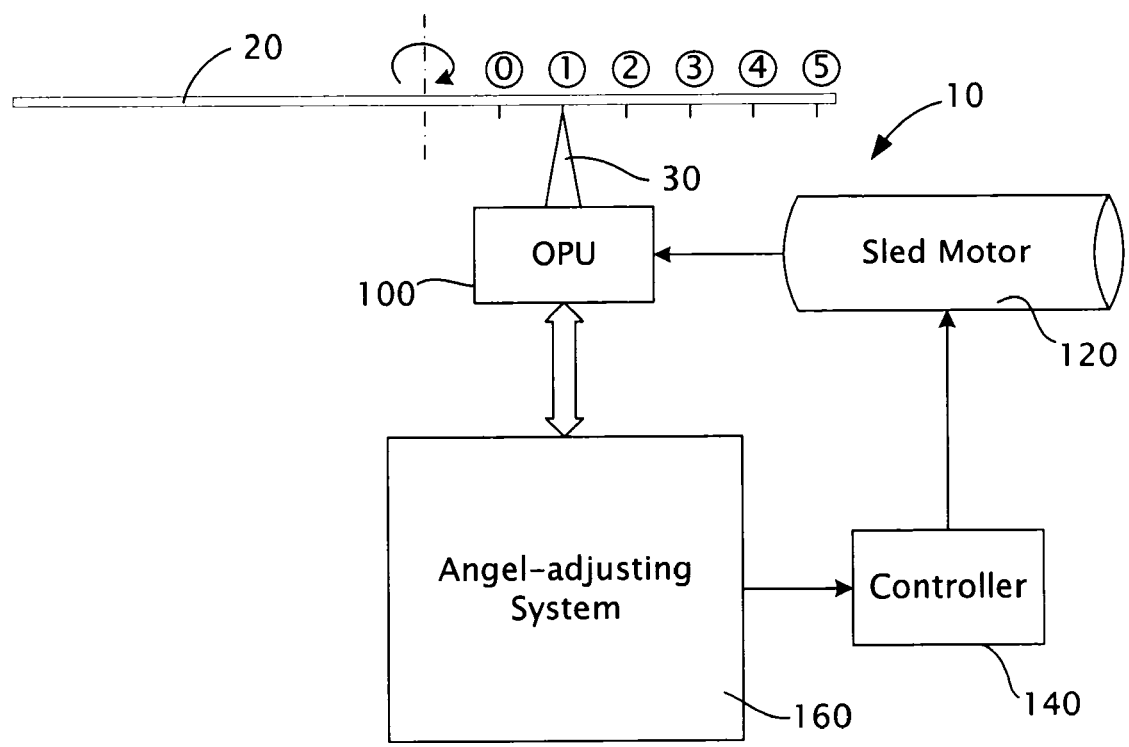
FIG. 1 is a schematic diagram of an optical disc drive in accordance with an exemplary embodiment, the optical disc drive includes a angle-adjusting system.

Referring to FIG. 1, an optical disc drive 10 includes an optical pickup unit (OPU) 100, a sled motor 120 for moving the OPU 100, a controller 150 connected to the sled motor 120 for controlling the sled motor 120, and an angle-adjusting system 160. The OPU 100 generates and focuses a light beam 30 onto an optical disc 20, and receives the light beam 30 reflected by the optical disc 20, thereby recording/reproducing data onto/from the optical disc 20. The angle-adjusting system 160 is used for adjusting a tilt angle of the light beam 30 related to the optical disc 20.

Figure 2:
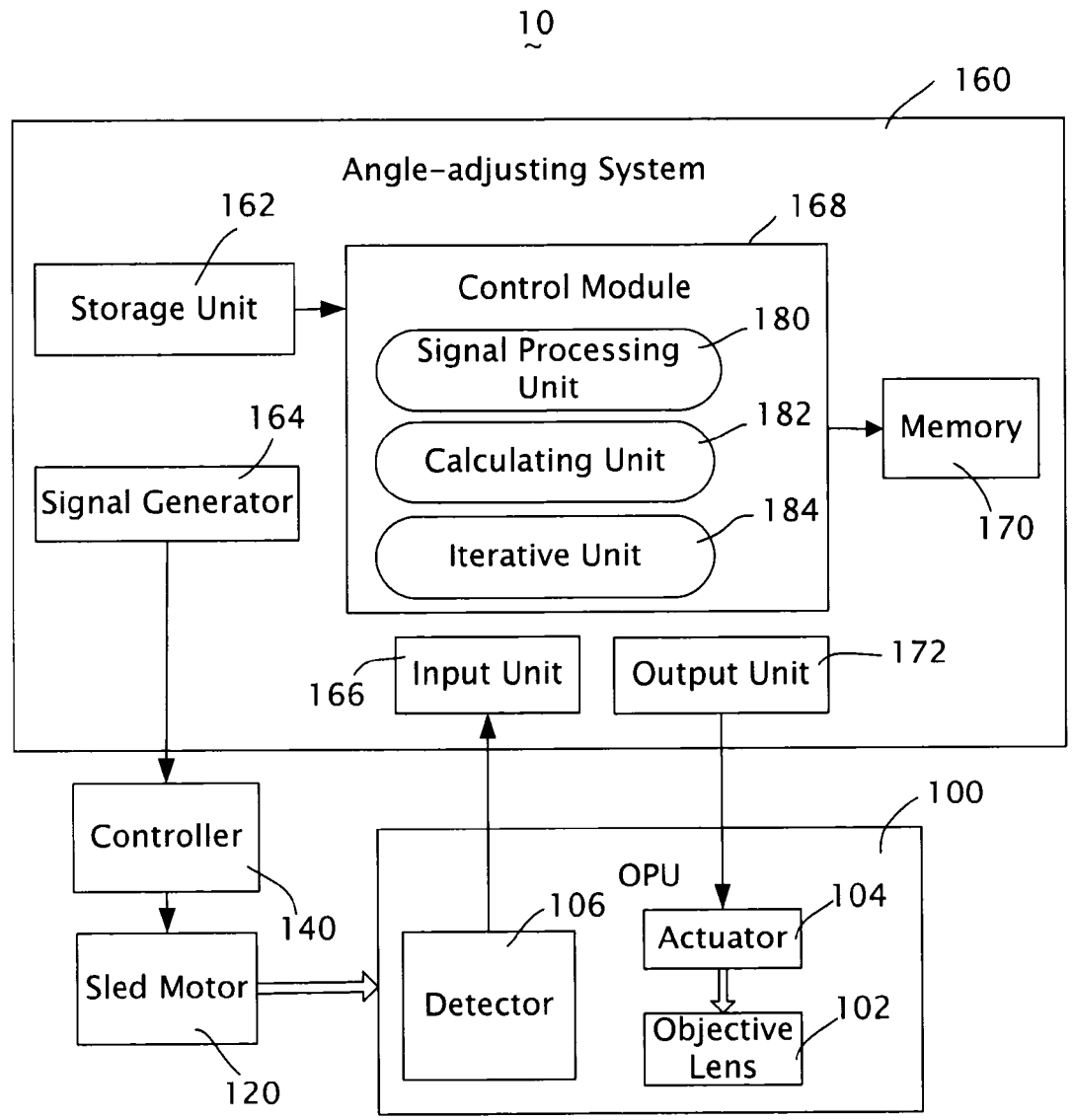
FIG. 2 is a detailed block diagram illustrating the angle-adjusting system of FIG. 1.

Referring to FIG. 2, the OPU 100 includes an objective lens 102 for focusing the light beams 30, an actuator 104 for moving the objective lens 102 so as to adjusting the tilt angle of the light beam 30, and a detector 106. The detector 106 is used for receiving the light beam 30 reflected from the optical disc 20 and generating focusing error signals based on the reflected light beam 30.

Figure 3:
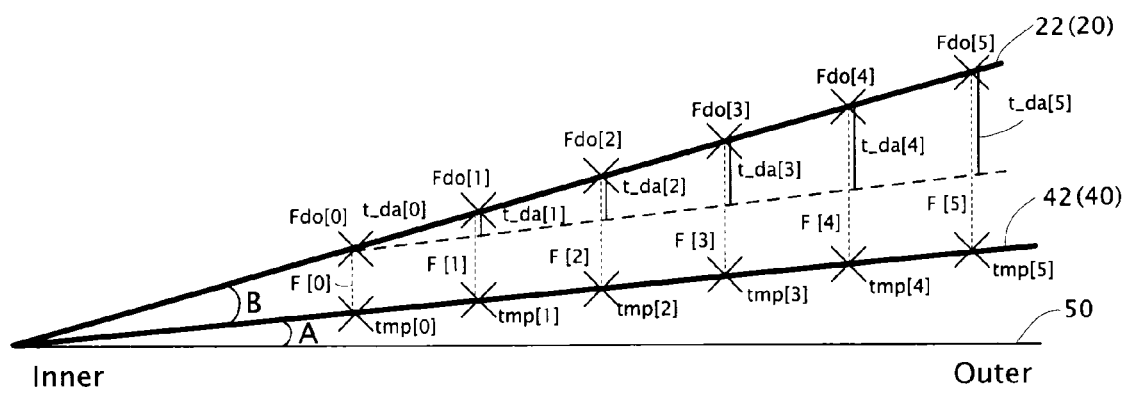
FIG. 3 is a schematic diagram representing an optical disc and an ideal glass plate.

Referring also to FIG. 3, relationships among a first position 22 for placing the optical disc 20, a second position 42 for placing an ideal glass plate 40, and a moving path 50 of the optical pickup unit 100 are illustrated. The ideal glass plate 40 is a glass disc having an ideal planar surface. Generally, the moving path 50 is not parallel to the second position 42 of the ideal glass plate 40 due to mechanical assembling errors when disposing the OPU 100 or the ideal glass plate 40, that is, there is a first angle A between the ideal glass plate 40 and the moving path 50. Furthermore, there is a second angle B between the first position 22 and the second position 42 because the optical disc 20 is not as ideal as the ideal glass plate 40. Thus, adjusting the tilt angle of the light beam 30 is required to compensate the first angle A and the second angle B.

The angle-adjusting system 160 includes a storage unit 162 for storing test parameters, a signal generator 164 for generating a move signal, an input unit 166, a control module 168, a memory 170, and an output unit 172. The test parameters are used for adjusting the objective lens 102 so as to compensate the first angle A so that the light beam 30 can be focused correctly onto the ideal glass plate 40. Generally, the test parameters are preinstalled in the storage unit 162, such as a read only memory, before the optical disc drive 10 is distributed. The test parameters are assigned to adjust the tilt angle during a recording/reproducing process of the optical disc 20.

The move signal is sent to the controller 150 for moving the OPU 100. That is, after receiving the move signal, the controller 150 controls the sled motor 120 to move the OPU 100 from an inner side of the disc 20 to an outer side of the disc 20.

When the OPU 100 moves from the inner side to the outer side, first, the tilt angle of the light beam 30 is adjusted based on the test parameters so as to compensate the first angle A; second, the optical disc drive 10 detects the optical disc 20 by receiving the light beam 30 reflected from the optical disc 20. The focusing error signals are generated based on the reflected light beam 30. The input unit 166 is used for receiving the focusing error signals from the detector 106 of the OPU 100 and transmitting the focusing error signals to the control module 168.

The control module 168 is used for processing the focusing error signals. The control module 168 includes a signal-processing unit 180 for processing the focusing error signals and generating current parameters. The current parameters are used for adjusting positions of the objective lens 102, so as to adjust the tilt angle of the light beam 30 relative to the optical disc 20. Thus, the second angle B between the optical disc 20 and the ideal glass plate 40 is compensated. The current parameters are stored in the memory 170. When the optical disc drive 10 starts to record/reproduce the data onto/from the optical disc 20, the output unit 172 outputs the current parameters and the current parameters are transmitted to the actuator 104 of the OPU 100. The actuator 104 adjusts the positions of the objective lens 102 based on the current parameters, so as to timely adjust the tilt angle of the light beam 30 relative to the optical disc 20.

In order to simplify the process of generating the current parameters, sampling points are defined on the optical disc 20. For example, the optical disc drive 10 predetermines six sampling points of the optical disc 20 to analyze the focusing error signals and generates six current parameters correspondingly. Additionally, a number of the test parameters is set to be six so as to corresponding to the six current parameters.

In this embodiment, the six test parameters are temp[0], temp[1], temp[2], temp[3], temp[4], and temp[5]. The six current parameters are Fdo[0], Fdo[1], Fdo[2], Fdo[3], Fdo[4], and Fdo[5]. When the OPU 100 moves from the inner side to the outer side, the optical disc drive 10 only tests the optical disc 20, and the data is not recorded/reproduced onto/from the optical disc 20, thus it does not need much time to obtain the six current parameters.

The control module 168 further includes a calculating unit 182 and an iteration unit 184. The calculating unit 182 is used for calculating middle parameters. The middle parameters include first differences F[i] (i=0,1,2,3,4,5), second differences t_da[i] (i=0,1,2,3,4,5), and an iteration coefficient.

The first differences F[i] (i=0,1,2,3,4,5) are differences between the current parameters and the test parameters. The first differences F[i] are listed below:

$F[0]=Fdo[0]-tmp0;$ $F[1]=Fdo[1]-tmp1;$ $F[2]=Fdo[2]-tmp2;$ $F[3]=Fdo[3]-tmp3;$ $F[4]=Fdo[4]-tmp4;$ $F[5]=Fdo[5]-tmp5.$ The second differences $t_{13} da[i]$ (i=0,1,2,3,4,5) are listed below:

$t\_da[0]=F[0]-F[0];$ $t\_da[1]=F[1]-F[0];$ $t\_da[2]=F[2]-F[0];$ $t\_da[3]=F[3]-F[0];$ $t\_da[4]=F[4]-F[0];$ $t\_da[5]=F[5]-F[0].$

The iteration coefficient is:

$$M=(sigma*(Fdo[5]-Fdo[0]))/1000,$$

Sigma is an experience value in the above formula.

The iteration unit 184 is used for generating more detailed target parameters to adjust the tilt angle of the light beam 30. Examples of iteration manners are:

$$dac_{13}[i]=(t\_da[i]-t\_da[i-1])*(5*sigma)+(M*1000)$$
$$i=1,2,3,4;$$

$$dac\_[i+1]=(t_{13}da[i+1]-t\_da[i])*(5*sigma)+(M*1000)\ i=1,2,3,4.$$

An iteration parameter is:

$$K[i]=(dac_{13}[i+1]-dac\_[i])/4$$

Therefore, former four target parameters are:

$$TILT\_DATA[0]{\sim}TILT\_DATA[3]=(((t\_da[1]-t\_da[0])*(5*sigma)+(M*1000))+400)/1000$$

When i=1, thus $$dac\_1=(t\_da[1]-t\_da[0])*(5*sigma)+(M*1000)$$

$$dac\_2=(t\_da[2]-t\_da[1])*(5*sigma)+(M*1000)$$

$$k1=(dac\_2-dac\_1)/4$$

$$TILT\_DATA[4]=(dac\_1+400)/1000$$

$$TILT\_DATA[5]=((k1*1+dac\_1)+400)/1000$$

$$TILT\_DATA[6]=((k1*2+dac\_1)+400)/1000$$

$$TILT\_DATA[7]=((k1*3+dac\_1)+400)/1000$$

When, i=2, thus $$dac\_2=(t\_da[2]-t\_da[1])*(5*sigma)+(M*1000)$$

$$dac\_3=(t\_da[3]-t\_da[2])*(5*sigma)+(M*1000)$$

$$k2=(dac\_3-dac\_2)/4$$

$$TILT\_DATA[8]=(dac\_2+400)/1000$$

$$TILT\_DATA[9]=((k2*1+dac\_2)+400)/1000$$

$$TILT\_DATA[10]=((k2*2+dac\_2)+400)/1000$$

$$TILT\_DATA[11]=((k2*3+dac\_2)+400)/1000$$

When i=3, thus $$dac\_3=(t\_da[3]-t\_da[2])*(5*sigma)+(M*1000)$$

$$dac\_4=(t\_da[4]-t\_da[3])*(5*sigma)+(M*1000)$$

$$k3=(dac\_4-dac\_3)/4$$

$$TILT\_DATA[12]=(dac\_3+400)/1000$$

$$TILT\_DATA[13]=((k3*1+dac\_3)+400)/1000$$

$$TILT\_DATA[14]=((k3*2+dac\_3)+400)/1000$$

$$TILT\_DATA[15]=((k3*3+dac\_3)+400)/1000$$

When i=4, thus $$dac\_4=(t\_da[4]-t\_da[3])*(5*sigma)+(M*1000)$$

$$dac\_5=(t\_da[5]-t\_da[4])*(5*sigma)+(M*1000)$$

$$k4=(dac\_5-dac\_4)/4$$

$$TILT\_DATA[16]=(dac\_4+400)/1000$$

$$TILT\_DATA[17]=((k4*1+dac\_4)+400)/1000$$

$$TILT\_DATA[18]=((k4*2+dac\_4)+400)/1000$$

$$TILT\_DATA[19]=((k4*3+dac\_4)+400)/1000.$$

The latter two target parameters are:

$$TILT\_DATA[20]{\sim}TILT\_DATA[21]=((t\_da[5]-t\_da[4])(5*sigma)+(tmp*1000)+400)/1000.$$

Therefore, there are 22 target parameters (TILT_DATA[00]~TILT_DATA[21]) to adjust the tilt angle of the light beam 30 at different areas of the optical disc 20. Thus, the tilt angle of the light beam 30 can be adjusted more accurately to adapt the optical disc 20.

Figure 4:
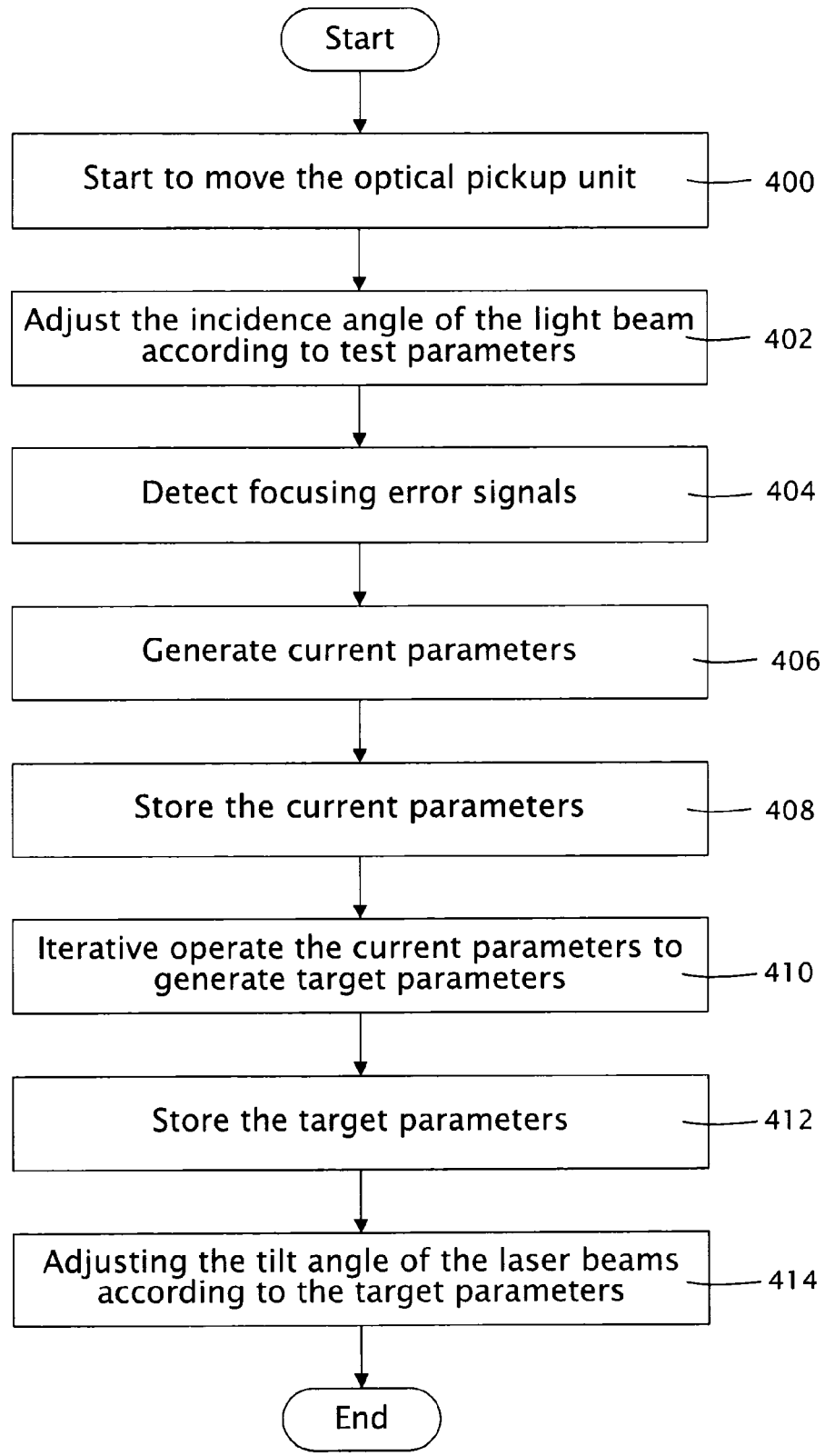
FIG. 4 is a flowchart of a exemplary procedure of a method for adjusting a tilt angle of a light beam.
Figure 5:
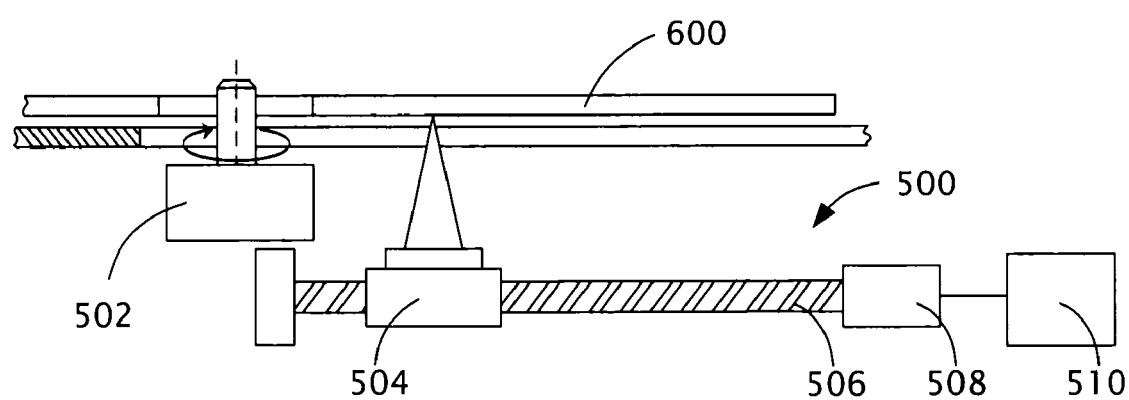
FIG. 5 is a schematic diagram of a traditional optical disc drive.

Referring to FIG. 4, a procedure of a method for adjusting the tilt angle of the light beam 30 is illustrated.

In step 400, the sled motor 120 starts to move the optical pickup unit 100 from the inner side to the outer side of the optical disc 20.

In step 402, the optical disc drive 10 adjusts the tilt angle of the light beam emitted by the optical pickup unit 100 according to the test parameters pre-stored in the storage unit 162. The test parameters are used for adjusting the tilt angle of the light beam to compensate the first angle A between the moving path 50 of the optical pickup unit 100 and the ideal glass plate 40.

In step 404, the optical disc drive 10 receives and analyzes the focusing error signals of the sampling points. For example, six points symmetrically distributed in the optical disc 20.

In step 406, the signal-processing unit 180 of the control module 168 generates the current parameters for adjusting the tilt angle of the light beam 30 based on the focusing error signal to compensate the second angle B between the optical disc 20 and the ideal glass plate 40.

In step 408, the current parameters are stored in the memory 170.

In step 410, the target parameters are calculated based on the test parameters and the current parameters. The calculating method and process are described above and are omitted here.

In step 412, the target parameters are stored in the memory 170.

In step 414, the output unit 172 outputs the target parameters to the actuator 104. The actuator 104 adjusts the positions of the objective lens 102 based on the target parameters, thus the tilt angle of the light beam 30 is adjusted.

It is easy to be understood that a number of the points to be sampled can be changed according to difference requirements. For example, the number of the points is four, five, or seven etc.

The embodiments described herein are merely illustrative of the principles of the present invention. Other arrangements and advantages may be devised by those skilled in the art without departing from the spirit and scope of the present invention. Accordingly, the present invention should be deemed not to be limited to the above detailed description, but rather by the spirit and scope of the claims that follow, and their equivalents.

What is claimed is:

1. A system for adjusting a tilt angle of a light beam emitted by an optical pickup unit, the system comprising:
   a storage unit for storing test parameters, the test parameters being used for adjusting the tilt angle of the light beam to compensate a first angle between a moving path of the optical pickup unit and an ideal glass plate;

an input unit for receiving focusing error signals, the focusing error signals being generated based on the light beam that is adjusted according to the test parameters and reflected from an optical disc;

a signal-processing unit for processing the focusing error signals and generating current parameters based on the focusing error signals;

a calculating unit for calculating middle parameters based on the test parameters and the current parameters;

an iteration unit for generating target parameters based on the middle parameters, a number of the target parameters being greater than that of the current parameters;

a memory for storing the current parameters and the target parameters; and an output unit for outputting the target parameters, the target parameters being used for adjusting the tilt angle of the light beam to compensate a second angle between the moving path of the optical pickup unit and the optical disc.

2. The system as claimed in claim 1, further comprising a signal generator for generating a move signal to move the optical pickup unit from an inner side of the optical disc to an outer side of the optical disc.

3. The system as claimed in claim 1, wherein the focusing error signals are sampled at different points of the optical disc.

4. The system as claimed in claim 3, wherein the points are symmetrically distributed in the optical disc.

5. The system as claimed in claim 3, wherein a number of the points is six.

6. A method for adjusting a tilt angle of a light beam emitted by an optical pickup unit of an optical disc drive, the method comprising:

adjusting the tilt angle of the light beam according to test parameters preinstalled in the optical disc drive;

detecting focusing error signals, the focusing error signals being generated based on the light beam reflected from an optical disc;

generating current parameters based on the focusing error signals;

storing the current parameters;

calculating middle parameters based on the test parameters and the current parameters;

generating target parameters based on the middle parameters, a number of the target parameters being greater than that of the current parameters;

storing the target parameters; and adjusting the tilt angle of the light beam according to the target parameters.

7. The method as claimed in claim 6, wherein the test parameters are used for adjusting the tilt angle of the light beam to compensate a first angle between a moving path of the optical pickup unit and an ideal glass plate.

8. The method as claimed in claim 6, further comprising the step of moving the optical pickup unit from an inner side to an outer side of the optical disc.

9. The method as claimed in claim 6, wherein the focusing error signals are sampled at different points of the optical disc.

10. The method as claimed in claim 9, wherein the points are symmetrically distributed in the optical disc.

11. The method as claimed in claim 9, wherein a number of the points is six.

12. An optical disc drive, comprising:

an optical pickup unit for emitting a light beam, the optical pickup unit comprising an actuator and an objective lens;

a sled motor for moving the optical pickup unit;

a controller for controlling the sled motor;

a storage unit for storing test parameters, the test parameters being used for adjusting the tilt angle of the light beam to compensate a first angle between a moving path of the optical pickup unit and an ideal glass plate;

an input unit for receiving focusing error signals, the focusing error signals being generated based on the light beam that is adjusted according to the test parameters and reflected from an optical disc;

a signal-processing unit for processing the focusing error signals and generating current parameters based on the focusing error signals;

a calculating unit for calculating middle parameters based on the test parameters and the current parameters;

an iteration unit for generating target parameters based on the middle parameters, a number of the target parameters being greater than that of the current parameters;

a memory for storing the current parameters and the target parameters; and an output unit for outputting the target parameters to the actuator, the actuator being used for adjusting positions of the objective lens according to the target parameters for adjusting the tilt angle of the light beam to compensate a second angle between the moving path of optical pickup unit and the optical disc.

13. The optical disc drive as claimed in claim 12, further comprising a signal generator for generating a move signal to be transmitted to the controller for moving the optical pickup unit from an inner side to an outer side of the optical disc.

14. The optical disc drive as claimed in claim 12, wherein the focusing error signals are sampled at different points of the optical disc.

15. The optical disc drive as claimed in claim 14, wherein the points are symmetrically distributed in the optical disc, a number of the points is six.

16. The system as claimed in claim 3, wherein a number of the points is equal to that of the test parameters and that of the current parameters.

17. The method as claimed in claim 9, wherein a number of the points is equal to that of the test parameters and that of the current parameters.

18. The optical disc drive as claimed in claim 14, wherein a number of the points is equal to that of the test parameters and that of the current parameters.

* * * * *